3,313,828
PROCESS FOR THE PRODUCTION OF LITHIUM
SOAPS OF EPOXIDIZED FATTY ACIDS
Alfred Szczepanek, Duren-Rolsdorf, Germany, assignor to Chemische Fabrik Hoesch K.-G., Duren, Rhineland, Germany, a corporation of Germany
No Drawing. Filed Sept. 3, 1964, Ser. No. 394,318
Claims priority, application Germany, Oct. 3, 1960,
C 22,461
11 Claims. (Cl. 260—348)

This invention relates to a process for the production of lithium soaps of epoxidized fatty acids. The term "epoxidized" as used herein means containing an oxirane ring.

It has already been suggested to use lithium soaps of epoxidized fatty acids in combination with lithium soaps of saturated fatty acids for the production of reinforced lithium lubricating greases.

The production of lithium soaps of this type can be effected by reacting the sodium soaps of epoxidized fatty acids with lithium chloride or by reacting the epoxidized fatty acids or their esters with alcohol-soluble or water/alcohol-soluble lithium compounds having a basic reaction. The production of lithium soaps by this process on a commercial scale is connected with several disadvantages such as poor filtrability of the soaps produced by reaction with lithium chloride and the necessary co-use of water-soluble organic solvents.

It has now been found that lithium soaps can be produced from epoxidized unsaturated acids or their esters (glycerides are included in the term esters) by reaction with lithium hydroxide in the aqueous phase while largely preserving the epoxy group if certain requirements are met. This is surprising because the epoxy group is very sensitive to the action of lithium hydroxide and is readily cleaved with formation of hydroxyl groups or by polymerization processes. According to the process of the invention, the cleavage of the epoxy group is delayed by reaction in the slurry phase and rapid saponification of the epoxidized fatty acids or esters.

To form the lithium soaps, the unsaturated epoxidized acids or their esters are dispersed in little water at room temperature or elevated temperature and a suspension or solution of lithium hydroxide in little water is added to the dispersion while vigorously mixing or stirring. The formation of the lithium soaps occurs very rapidly either by neutralization of the fatty acids or by the very rapidly occuring saponification of their esters. The quantity of water should be kept as low as is possible and is calculated such that a well kneadable or stirrable mass is formed. Due to the rapid formation of the lithium soaps which are only slightly dissolved and hydrolytically cleaved at the high concentration obtaining by reason of use of small amounts of water, the slowly added lithium hydroxide is immediately consumed so that its action on the epoxy group is unimportant. After the addition of the lithium hydroxide solution, stirring is continued for ½ to 1 hour at room temperature to bring the reaction to completion and the reaction is followed by determining the free fatty acid or the free esters. The pastes of lithium soaps obtained have a solids content of about 90 to 30% and preferably of 50 to 60%. They are dried at 60 to 80° C. without washing and filtration and the dried product is subsequently ground or comminuted. A post reaction takes place during the drying step.

The lithium soaps produced by the process of the invention are free flowing powders of low tackiness when starting from epoxidized fatty acids and are waxy and also somewhat tacky when starting from esters.

The process of the invention considerably simplifies the commercial production of lithium soaps of epoxidized fatty acids since neither filtration nor a washing step are required.

The starting materials used are naturally occurring unsaturated fatty acids and their mixtures with saturated fatty acids, their esters and glycerides and the epoxidation products produced therefrom. These contain, of course, the by-products formed in the epoxidation such, for example, as glycol derivatives.

The lithium soaps of epoxidized fatty acids produced by the new process contain as by-products small amounts of soap from products formed by cleavage of the epoxy group or by polymerization processes. These by-products do not interfere with the production of lubricating grease.

The invention is illustrated by the following examples.

*Example 1.—Lithium soap from epoxidized linseed oil fatty acids*

16 gms. of epoxidized linseed oil fatty acid ($EpO_2$ 7.0%) are dispersed in 9.9 ml. of water at room temperature while stirring and then 2.23 gms. of lithium hydroxide (53.5%) dispersed in 7.4 ml. of water are added to the dispersion. Stirring is continued for ½ hour and the reaction product is dried at 60–80° C. Yield: 18 gms.; appearance: faintly yellowish powder; Li content: 2.4%; free fatty acid: 0.7%; melting point: 160–174° C.; $EpO_2$ of the fatty acid: 4%.

*Example 2.—Lithium soap from epoxidized oleic acid*

30.8 gms. of epoxidized oleic acid ($EpO_2$ 4.0%) are dispersed in 19.9 ml. of water at room temperature while stirring. A suspension of 4.46 gms. of lithium hydroxide (53.5%) in 14.9 ml. of water is slowly added to the dispersion. The homogeneous paste is stirred for another ½ hour at room temperature and then dried at 60° C. Yield: 28 gms.; free fatty acid: 0.3%; Li content: 2.3%; $EpO_2$: 2.5%; melting point: about 198° C.; appearance: yellowish powder.

*Example 3.—Lithium soap from epoxidized linseed oil*

30.8 gms. of epoxidized linseed oil ($EpO_2$ 7.0%) are dispersed in 19.9 ml. of water at room temperature and a suspension of 4.46 gms. of lithium hydroxide (53.5%) in 14.9 ml. of water is added to the dispersion. The homogeneous paste is stirred for another ½ hour at room temperature and then dried at 60° C. Yield: 31 gms.; appearance: faintly yellowish powder; Li content: 2.1%; $EpO_2$: 5.6%; melting point: 150–160° C.

*Example 4.—Lithium soap from epoxidized soya bean oil*

51 gms. of epoxidized soya bean oil (epoxy oxygen content: 5.6%) are dispersed in 30 ml. of water at 80° C. and a suspension of 8.88 gms. of lithium hydroxide (53.3%) in 30 ml. of water of 80° C. is slowly added to the dispersion. After the addition, stiring is continued for 30 minutes and the product is then dried at 60° C. Yield: 52 gms.; appearance: very fine white powder; epoxy oxygen content: 5.2%; lithium content: 2.5%; content of unconverted soya bean oil: 0.8%.

Further regarding the fatty acids and esters which can be used, whereas the invention particularly contemplates naturally occurring fatty acids and glycerides since the products obtained from such materials are the lithium soaps of commercial interest, other fatty acids and esters can be used. Thus any fatty acid or ester which can be provided as the dispersed phase in an aqueous slurry can be used. The preferred starting materials are fatty acids of about $C_{12}$ to $C_{24}$ carbon atoms, preferably $C_{16}$ to $C_{18}$ carbon atoms, and the corresponding esters. The alcohol moiety of the ester can be that of an aliphatic alcohol having about $C_1$ to $C_8$ carbon atoms, preferably about $C_1$ to $C_4$ carbon atoms, and can of course be derived from glycerol.

With respect to the concentration of the lithium hydroxide containing aqueous medium, this can be and preferably is a slurry in which lithium hydroxide is present as a dispersed phase. A concentrated solution, however, can be used. The solution can be saturated without dispersed lithium hydroxide being present or it can be less than saturated. The important consideration is not the concentration of lithium hydroxide in the aqueous medium containing it and which is added to the slurry of fatty acid or ester, but rather the concentration in the medium to which the lithium hydroxide (in aqueous medium) is added. Thus, if the concentration of the medium to which the lithium hydroxide (in aqueous medium) is added is as described herein and further the concentration at the conclusion of the reaction is as described herein, then the advantages of the invention will be realized. Of course the medium added to the acid or ester slurry should not be so diluted as to preclude the obtaining of the concentrations disclosed for the reaction medium at the conclusion of the reaction.

To explain in more detail the slow addition of the lithium hydroxide containing medium and stirring of the medium, in Example 1, above, addition of the lithium hydroxide is at the rate of 2 ml. dispersion per minute and stirring is effected by means of a propeller mixer.

Regarding the drying of the product, the purpose of this step is merely to remove water and any temperature below that which will result in reaction destroying the product can be used. The temperature in general will be less than about 60–80° C., more commonly less than about 80° C. There is no lower temperature limit; if desired, vacuum can be employed.

This application is a continuation-in-part of application Ser. No. 140,994 filed Sept. 27, 1961, now abandoned.

What I claim is:

1. The process for the production of solid lithium soap of epoxidized fatty acid which comprises forming an aqueous slurry wherein a material selected from the group consisting of epoxidized fatty acid having about 12–24 carbon atoms and esters of epoxidized fatty acid the fatty acid moiety of which has about 12–24 carbon atoms, in solid state is dispersed in water, and slowly adding to said slurry an aqueous solution of lithium hydroxide, maintaining the slurry with lithium hydroxide present therein at a temperature and for a time sufficient for formation of a slurry of lithium soap, having a solids content of about 30–90%, and drying the slurry of lithium soap, whereby the lithium soap is formed while destruction of the epoxy groups under the conditions of the reaction is suppressed.

2. A process according to claim 1, wherein the material selected from the group consisting of epoxidized fatty acid and esters of epoxidized fatty acid is epoxidized naturally occurring material.

3. A process according to claim 1, wherein the aqueous solution of lithium hydroxide contains solid lithium hydroxide in suspension.

4. A process according to claim 1, said solids content being about 50–60%.

5. A process according to claim 1, wherein said drying is effected by evaporation of water of the slurry.

6. A process according to claim 1, wherein the aqueous solution of lithium hydroxide is saturated.

7. A process for the production of solid lithium soap of epoxidized fatty acid which comprises forming an aqueous slurry wherein a material selected from the group consisting of epoxidized fatty acid having about 12–24 carbon atoms and esters of epoxidized fatty acid the fatty acid moiety of which has about 12–24 carbon atoms, in solid state are dispersed in water, said material being epoxidized naturally occurring material, and slowly adding to said slurry an aqueous solution of lithium hydroxide, and maintaining the slurry with lithium hydroxide present therein at a temperature of room temperature to about 80° C. for a time sufficient for formation of the lithium soap by reaction of said material and lithium hydroxide to form the lithium soap, the reaction going substantially to completion and providing a slurry of solid and aqueous medium, the solid containing lithium soap, the solids content of the slurry containing lithium soap being about 30–90%, and drying the slurry containing lithium soap by evaporating water from the slurry.

8. Process according to claim 1, wherein said esters of epoxidized fatty acid contain an alcohol moiety having about 1–8 carbon atoms.

9. A process according to claim 8, wherein the slurry is stirred during addition of the lithium hydroxide and the lithium hydroxide is added slowly.

10. Process according to claim 1, wherein the slurry of lithium soap is dried at 60–80° C.

11. Process according to claim 1, wherein said material is epoxidized fatty acid.

References Cited by the Examiner

UNITED STATES PATENTS

| | | | |
|---|---|---|---|
| 2,684,353 | 7/1954 | Greenspan et al. | 260—348 |
| 3,002,004 | 9/1961 | Beavers et al. | 260—348.5 |
| 3,062,841 | 11/1962 | Yang et al. | 260—348.5 |

FOREIGN PATENTS 825,691   12/1959   Great Britain.

WALTER A. MODANCE, *Primary Examiner.*

JOHN D. RANDOLPH, *Examiner.*

NORMA S. MILESTONE, *Assistant Examiner.*